(12) United States Patent
Qian et al.

(10) Patent No.: US 10,915,624 B2
(45) Date of Patent: Feb. 9, 2021

(54) METHOD AND APPARATUS FOR DETERMINING BEHAVIOR INFORMATION CORRESPONDING TO A DANGEROUS FILE

(71) Applicant: BAIDU ONLINE NETWORK TECHNOLOGY (BEIJING) CO., LTD., Beijing (CN)

(72) Inventors: Keming Qian, Beijing (CN); Mingqiang Guo, Beijing (CN)

(73) Assignee: Baidu Online Network Technology (Beijing) Co., Ltd., Beijing (CN)

(*) Notice: Subject to any disclaimer, the term of this patent is extended or adjusted under 35 U.S.C. 154(b) by 555 days.

(21) Appl. No.: 15/300,770

(22) PCT Filed: Jun. 25, 2015

(86) PCT No.: PCT/CN2015/082409
§ 371 (c)(1),
(2) Date: Jan. 13, 2017

(87) PCT Pub. No.: WO2016/145749
PCT Pub. Date: Sep. 22, 2016

(65) Prior Publication Data
US 2017/0124321 A1    May 4, 2017

(30) Foreign Application Priority Data
Mar. 18, 2015   (CN) .......................... 2015 1 0119820

(51) Int. Cl.
*G06F 21/53* (2013.01)
*G06F 21/56* (2013.01)
*H04L 29/06* (2006.01)

(52) U.S. Cl.
CPC ............ *G06F 21/53* (2013.01); *G06F 21/566* (2013.01); *G06F 21/568* (2013.01); *H04L 63/1408* (2013.01)

(58) Field of Classification Search
CPC ...... G06F 21/53; G06F 21/568; G06F 21/566; H04L 63/1408
See application file for complete search history.

(56) References Cited

U.S. PATENT DOCUMENTS 5,974,549 A * 10/1999 Golan ..................... G06F 9/468
714/47.3
6,192,512 B1 * 2/2001 Chess ..................... G06F 9/455
714/38.12
(Continued)

FOREIGN PATENT DOCUMENTS

CN    1314638 A    9/2001
CN    1356631 A    7/2002
(Continued)

OTHER PUBLICATIONS

Gadhiya, Sayan, and Kaushal Bhaysar. "Techniques for malware analysis." International Journal of Advanced Research in Computer Science and Software Engineering 3.4 (2013). (Year: 2013).*
(Continued)

*Primary Examiner* — Jung W Kim
*Assistant Examiner* — Sameera Wickramasuriya
(74) *Attorney, Agent, or Firm* — Nixon Peabody LLP

(57) ABSTRACT

A method for determining behavior information corresponding to a dangerous file in a computer device includes running the dangerous file in a virtual environment of the computer device when detecting existence of the dangerous file, wherein the virtual environment comprises at least one virtual API identical to at least one real API in a real environment of the computer device; monitoring behavior(s) of the dangerous file in the virtual environment to obtain the behavior information corresponding to the dangerous file. According to the solution of the present disclosure, it does not need to analyze disruptive behaviors of a dangerous file manually, the behavior information of the dangerous file can (Continued)

be quickly obtained in a virtual environment, thereby quickly and comprehensively repair the real system of the computer device.

18 Claims, 3 Drawing Sheets

(56) References Cited

U.S. PATENT DOCUMENTS

| | | | |
|---|---|---|---|
| 7,779,472 B1* | 8/2010 | Lou | G06F 21/566 |
| | | | 726/22 |
| 8,312,547 B1* | 11/2012 | Sobel | G06F 21/567 |
| | | | 707/705 |
| 8,407,787 B1 | 3/2013 | Lou et al. | |
| 8,555,385 B1 | 10/2013 | Bhatkar et al. | |
| 8,990,946 B1* | 3/2015 | Yarykin | H04L 63/0272 |
| | | | 713/188 |
| 9,917,855 B1* | 3/2018 | Li | G06F 21/566 |
| 9,973,531 B1* | 5/2018 | Thioux | H04L 63/1466 |
| 2002/0162015 A1 | 10/2002 | Tang | |
| 2008/0005782 A1* | 1/2008 | Aziz | G06F 9/45537 |
| | | | 726/3 |
| 2009/0089879 A1* | 4/2009 | Wang | G06F 21/53 |
| | | | 726/24 |
| 2009/0158432 A1* | 6/2009 | Zheng | G06F 21/562 |
| | | | 726/24 |
| 2010/0138924 A1* | 6/2010 | Heim | G06F 21/566 |
| | | | 726/24 |
| 2011/0145926 A1* | 6/2011 | Dalcher | G06F 11/3466 |
| | | | 726/26 |
| 2012/0254993 A1* | 10/2012 | Sallam | G06F 21/53 |
| | | | 726/22 |
| 2012/0317570 A1* | 12/2012 | Dalcher | G06F 21/53 |
| | | | 718/1 |
| 2014/0096250 A1* | 4/2014 | Belov | G06F 21/566 |
| | | | 726/23 |
| 2015/0067830 A1 | 3/2015 | Johansson et al. | |
| 2015/0363171 A1* | 12/2015 | Esfahany | G06F 40/205 |
| | | | 717/106 |
| 2016/0112441 A1 | 4/2016 | Bae | |

FOREIGN PATENT DOCUMENTS

| | | |
|---|---|---|
| CN | 101350049 A | 1/2009 |
| JP | 2010-140196 A | 6/2010 |
| JP | 2011-013917 A | 1/2011 |
| JP | 2012-064208 A | 3/2012 |
| KR | 20110087826 A | 8/2011 |

OTHER PUBLICATIONS

C. Greamo and A. Ghosh, "Sandboxing and Virtualization: Modern Tools for Combating Malware," in IEEE Security & Privacy, vol. 9, No. 2, pp. 79-82, Mar.-Apr. 2011, doi: 10.1109/MSP.2011.36. (Year: 2011).*

First Office Action for Application No. 201510119820.7 dated Apr. 21, 2017, 16 pages.

International Search Report for PCT/CN2015/082409 dated Sep. 25, 2015, 2 pages.

* cited by examiner

METHOD AND APPARATUS FOR DETERMINING BEHAVIOR INFORMATION CORRESPONDING TO A DANGEROUS FILE

CROSS REFERENCE TO RELATED APPLICATIONS

This present application is a U.S. national stage under 35 U.S.C. § 371 of International Application No. PCT/CN2015/082409, filed on Jun. 25, 2015, which claims priority to Chinese patent application No. 201510119820.7, filed on Mar. 18, 2015 and entitled Method and Apparatus for Determining Behavior Information Corresponding to a Dangerous File. Each of the above-referenced applications is incorporated herein by reference to their entireties.

TECHNICAL FIELD

The present disclosure relates to the field of computer technology, and in particular to a method and apparatus for determining behavior information corresponding to a dangerous file in a computer device.

BACKGROUND

In the prior art, when a dangerous file is detected in a computer device, the dangerous file is always subject to a simple delete operation. However, when the dangerous file is running in the computer device, it always executes disruptive behavior(s) (e.g., disruptive behavior(s) executed on a registry entry, a scheduled task, an executable file, etc.). Therefore, simply deleting the dangerous file cannot make the computer device return to the originally normal system environment.

Besides, such disruptive behavior(s) can only be obtained by manually analyzing dangerous files and their running processes, which needs a user to input considerable time and energy, the processing period is rather long, and the efficiency is extremely low; moreover, the manual analysis is not comprehensive or part of logic of the dangerous file is not triggered, such that the all disruptive behaviors of the dangerous file cannot be completely obtained.

SUMMARY

An objective of the present disclosure is to provide a method and apparatus for determining behavior information corresponding to a dangerous file in a computer device.

One aspect of the present disclosure provides a method for determining behavior information corresponding to a dangerous file in a computer device, including:

running the dangerous file in a virtual environment of the computer device when detecting existence of the dangerous file, wherein the virtual environment comprises at least one virtual API identical to at least one real API in a real environment of the computer device;

monitoring behavior(s) of the dangerous file in the virtual environment to obtain the behavior information corresponding to the dangerous file.

Another aspect of the present disclosure provides an apparatus for determining behavior information corresponding to a dangerous file in a computer device, including:

a module configured to run the dangerous file in a virtual environment of the computer device when detecting existence of the dangerous file, wherein the virtual environment comprises at least one virtual API identical to at least one real API in a real environment of the computer device;

a module configured to monitor behavior(s) of the dangerous file in the virtual environment to obtain the behavior information corresponding to the dangerous file.

Compared with the prior art, the present disclosure has the following advantages: 1) it can obtain behavior information of a dangerous file by running the dangerous file in the virtual environment of the computer device. The process needs no manual analysis and thus greatly saves the time needed for obtaining the behavior information; 2) because all operation behaviors of the dangerous file may be recorded through virtual execution of virtual API(s), the behavior information obtained by the computer device is comprehensive, thereby avoiding the situation that the real environment of the computer device cannot be comprehensively repaired due to incomplete behavior information; 3) running a dangerous file in a virtual environment will not affect the real environment of the computer device, and the occupation space of the virtual environment in the computer devices extremely small; moreover, in the virtual environment, it is not needed to actually perform the function of the virtual API, instead, it is only needed to return a feedback result identical to that of invoking a real API corresponding to the virtual API in the real environment. This enables the dangerous file to run in the virtual environment faster, thereby quickly obtaining the behavior information of the dangerous file; 4) the computer device can repair the real environment of the computer device according to the behavior information of the dangerous file obtained in the virtual environment, thereby quickly and comprehensively repairing the disruption to the real environment caused by the dangerous file and other dangerous files released by the dangerous file.

BRIEF DESCRIPTION OF THE ACCOMPANYING DRAWINGS

Other features, objectives, and advantages of the present disclosure will become more apparent through reading the following detailed depiction of the non-limitative embodiments with reference to the accompanying drawings.

Same or similar reference numerals in the drawings represent same or similar components.

DETAILED DESCRIPTION

Hereinafter, further detailed description will be made to the present invention with reference to the accompanying drawings.

Figure 1:
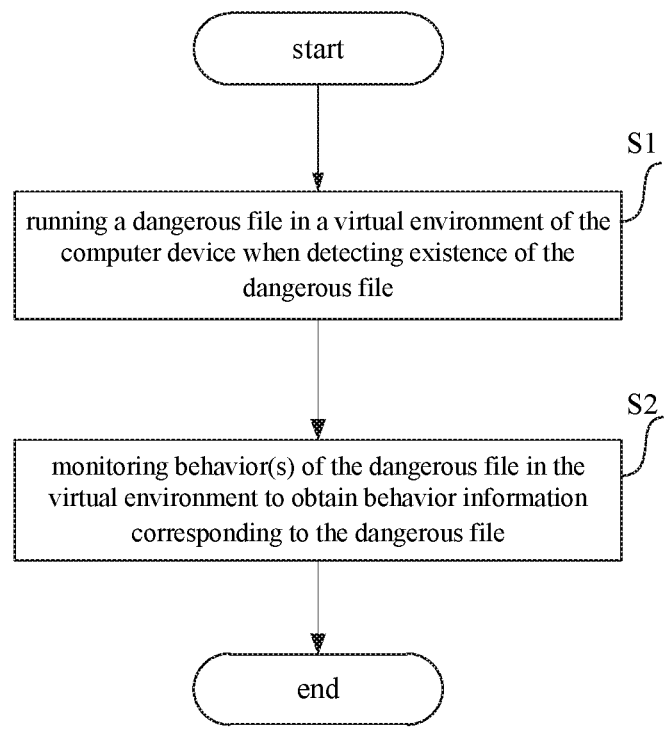
FIG. 1 shows a flow diagram of a method for determining behavior information corresponding to a dangerous file in a computer device according to one embodiment of the present disclosure.

FIG. 1 shows a flow diagram of a method for determining behavior information corresponding to a dangerous file in a computer device according to one embodiment of the present disclosure.

Wherein, the method according to the present embodiment is mainly implemented through a computer device, the computer device includes network device and user equipment. The network device includes, but not limited to, a single network server or a plurality of network servers, or a cloud consisting of mass computers or network servers based on cloud computing, wherein cloud computing is a kind of distributed computing, which is a super virtual computer consisting of a group of loosely coupled computer sets; the network where the network device is located includes, but not limited to, Internet, Wide Area Network, Metropolitan Area Network, Local Area Network, VPN (Virtual Private Network) network, etc.; the user equipment includes, but not limited to, a PC (Personal Computer) machine, a tablet, a smart phone, a PDA (Personal Digital Assistant), an IPTV (Internet Protocol Television), and etc.

It should be noted that the computer device is only exemplary, and other existing or future possibly developed computer devices, if applicable to the present disclosure, should also be included within the protection scope of the present disclosure and incorporated here by reference.

The method according to the present embodiment includes step S1 and step S2.

In step S1, the computer device runs a dangerous file in a virtual environment of the computer device when detecting existence of the dangerous file.

Wherein, the dangerous file includes any file that is dangerous, e.g., a virus file, a Trojan file, etc.

Wherein, the virtual environment is used for virtualizing the real environment of the computer device, the virtual environment including at least one virtual API identical to at least one real API (Application Program Interface) in the real environment. Wherein, the virtual API can be invoked in the virtual environment and can return a feedback result identical to that of invoking a real API corresponding to the virtual API in the real environment. Wherein, the real environment is used for indicating a system environment really running in the computer device, e.g., system environment corresponding to a Windows operating system really running in the computer device. Wherein, the real API is used for indicating an API in the real environment, e.g., a system API in a Windows operating system really running in the computer device.

For example, the real environment of the computer device has the following real API: DeleteFile. The real API is used for deleting a designated file in the real environment and returning a feedback result indicating successful execution of delete operation; the virtual environment in the computer device has a virtual API corresponding to the real API, invoking of the virtual API in the virtual environment also returns a feedback result for indicating successful execution of delete operation.

It should be noted that preferably, when invoking the virtual API in the virtual environment, a function of the virtual API is not really executed; and it is only needed to virtualize an effect of invoking a real API corresponding to the virtual API. For example, in the example above, the virtual API corresponding to DeleteFile is invoked in the virtual environment, the virtual API does not execute an operation of deleting the designated file in the virtual environment; instead, it directly returns, when being invoked, a feedback result for indicating successful execution of delete operation so as to virtualize an effect of invoking the DeleteFile.

Preferably, the virtual environment does not need to configure registry and environment variables and the like in the computer device, such that a corresponding install operation is not needed to execute, i.e., it can be directly started and run. It should be noted that the virtual environment may be started in a variety of scenarios, e.g., automatic start when the computer device is powered on, automatic start when a scanning operation is executed in the computer device, automatic start when detecting existence of a dangerous file, or started by user operation, etc. It should be noted that preferably, the virtual environment, each time after being started, is returned to its initial environment; more preferably, after the virtual environment is started and each dangerous file is completely executed, the virtual environment may automatically execute an initialization operation, or may execute the initialization operation according to user operation so as to return the virtual environment to the initial environment.

It should be further noted that the occupation space of the virtual environment in the computer device may be extremely small (e.g., the occupation space is about 10M), and its running have no effect on running of the real system of the computer device. Preferably, a size of the occupation space may change according to behavior(s) of the dangerous file (e.g., the behavior of releasing other files by the dangerous file) in the virtual environment.

Specifically, when detecting existence of a dangerous file, the computer device provides the dangerous file to the virtual environment of the computer device and runs the dangerous file in the virtual environment.

For example, when detecting existence of a virus file in the computer device, the computer device provides the virus file to the virtual environment of the computer device and runs the virus file in the virtual environment.

Preferably, at least one virtual API in the virtual environment comprises an application reading virtual API capable of reading current active application(s), the step S1 further including: the computer device provides application information of the currently active application(s) to the dangerous file when the dangerous file invokes the application reading virtual API.

Wherein, the application reading virtual API includes any virtual API that reads current active application(s), e.g., a virtual API corresponding to CreateToolhelp32Snapshot in the real system, the CreateToolhelp32Snapshot is for obtain information of all currently active processes in the real system.

Wherein, the application information includes any information for indicating currently active application(s), e.g., an application name of the currently active application, a process ID of the currently active application, etc.

Specifically, during a process of running a dangerous file in a virtual environment, when the dangerous file invokes an application reading virtual API, the computer device returns application information of the currently active application(s) to the dangerous file through the reading virtual API.

For example, running a virus file file1 in a virtual environment; when the file1 invokes the application reading virtual API, the computer device returns application information of the currently active application(s) to file1 through the application reading virtual API, the application information is used for indicating that the currently active applications comprises APP1 and APP2.

It should be noted that the application reading virtual API may employ a plurality of manners to obtain the application information of the currently active application(s).

As an example, the application reading virtual API obtains the application information of the currently active application(s) by configuring, by a user, process(es) of the virtual environment. For example, the user configures a process list in the virtual environment, adds applications APP1 and APP2 in the process list; then the currently active applications that can be read by the application reading virtual API according to the process list include APP1 and APP2.

As another example, the application reading virtual API triggers obtaining application information of the currently active application(s) from the real environment of the computer device. For example, the application reading virtual API triggers invoking a real API corresponding to the application reading virtual API in the real environment of the computer device, and obtains the application information of the currently active application(s) according to a result returned by the real API.

It should be noted that the example above is only for better illustrating the technical solution of the present invention, not for limiting the present invention. Those skilled in the art should understand that any implementation manner of running the dangerous file in the virtual environment of the computer device when detecting existence of the dangerous file should be included within the scope of the present invention.

In step S2, the computer device monitors behavior(s) of the dangerous file in the virtual environment to obtain the behavior information corresponding to the dangerous file.

Specifically, the computer device may obtain behavior information corresponding to the dangerous file by monitoring and recording behavior(s) executed by the dangerous file in the virtual environment.

Preferably, in the virtual environment, the computer device monitors the behavior(s) of the dangerous file based on the virtual API(s) invoked by the dangerous file during the running process, so as to obtain behavior information corresponding to the dangerous file.

For example, in the virtual environment, the computer device records all behaviors of the dangerous file causing the virtual environment to change by the virtual API(s) invoked by the dangerous file during the running process, and obtains behavior information corresponding to such behaviors.

Wherein, the behavior information includes any information related to the operation behaviors of the dangerous file in the virtual environment. Preferably, the behavior information includes, but not limited to:

1) Information Related to File Operation Behavior.

Wherein, the file operation behavior includes any operation behavior that can be executed on a file, e.g., creating, updating, and deleting a file, etc. Preferably, the information related to file operation behavior includes, but not limited to, information for indicating an operation behavior type of a file (e.g., creating, updating, and deleting operation behaviors), name of the operated file(s), path information of the operated file, etc.

2) Information Related to Registry Operation Behavior.

Wherein, the registry operation behavior includes any operation behavior that can be executed on the registry, e.g., creating, setting, and deleting a registry entry, etc. Preferably, the information related to registry operation behavior includes, but not limited to: information for indicating an operation behavior type (e.g., creating, setting, and deleting operation behaviors), registry entry being operated, and a value corresponding to the registry entry, etc.

3) Information Related to Process Operation Behavior.

Wherein, the process operation behavior includes any operation behavior that can be executed on the process, e.g., creating and closing a process, cross-process writing, etc. Preferably, the information related to process operation behavior includes, but not limited to, information for indicating an operation behavior type of a thread (e.g., creating and closing a process, cross-process writing), an identifier ID of the operated process, path information corresponding to the operated process, etc.

4) Information Related to Thread Operation Behavior.

Wherein, the thread operation behavior includes any operation behavior that can be executed on the thread, e.g., thread injection, etc. Preferably, the information related to thread operation behavior includes, but not limited to: information for indicating an operation behavior type of the thread, an identifier ID of the operated thread, a feature value corresponding to the operated thread, etc.; wherein, the feature value is used for indicating feature(s) of the thread. Preferably, the feature value is a check value corresponding to the code length of the thread; for example, the code length of the thread is 0x100, and the feature value is a CRC (Cyclic Redundancy Check) 32 value corresponding to the code length.

It should be noted that the behavior information is only an example, not a limitation to the present invention. Those skilled in the art should understand any information related to behaviors of a dangerous file in a virtual environment should be included within a scope of the behavior information depicted herein.

As a preferred solution, the method of the present embodiment further includes step S4, and the step S2 further includes step S21.

In step S4, in the virtual environment, the computer device obtains at least one file released by the dangerous file.

For example, in the virtual environment, the computer device obtains the following files released by the dangerous file file2 during the running process: ser2vet.ext, autorun.inf.

In step S21, in the virtual environment, the computer device monitors behavior(s) of the dangerous file and the at least one file released by the dangerous file, so as to obtain behavior information corresponding to the dangerous file.

For example, in step S4, the computer device obtains the following dangerous files released by the dangerous file file2: ser2vet.exe, autorun.inf; in step S21, in the virtual environment, the computer device monitors behaviors of file2, ser2vet.exe, and autorun.inf respectively, so as to obtain behavior information of the three dangerous files and takes the obtained behavior information as the behavior information corresponding to the dangerous file file2.

It should be noted that the manner in which the computer device monitors behavior(s) of each file released by the dangerous file is identical or similar to the manner of monitoring behavior(s) of dangerous files in aforesaid step S2, which will not be detailed here.

It should be noted that the example above is only for better illustrating the technical solution of the present invention, not for limiting the present invention. Those skilled in the art should understand that any implementation manner of monitoring behavior(s) of the dangerous file in the virtual environment to obtain behavior information corresponding to the dangerous file should be included within the scope of the present invention.

As a preferred solution, the method of the present embodiment further includes step S5.

In step S5, the computer device closes the virtual environment when satisfying a predetermined close condition.

Wherein, the predetermined close condition comprises any predetermined condition for indicating closing of the virtual environment. Preferably, the predetermined close condition includes, but not limited to:

1) The Dangerous File Performs Process Exit Operation in the Virtual Environment.

Wherein, the process exit operation includes any operation for indicating exiting from the process of the dangerous file; preferably, the process exit operation includes, but not limited to, an auto-delete operation of the dangerous file, an operation of deleting the dangerous file executed by the user in the virtual environment, etc.

2) Running Time of the Dangerous File in the Virtual Environment Exceeds a Predetermined Time.

For example, if the predetermined time is 5 s, when the running time of the dangerous file in the virtual environment exceeds 5 s, the predetermined close condition is satisfied.

It should be noted that the predetermined close condition is only exemplary, not for limiting the present invention. Those skilled in the art should understand that any predetermined condition for indicating closing of the virtual environment should be included within the scope of the predetermined close condition of the present invention.

It should be noted that the example above is only for better illustrating the technical solution of the present invention, not for limiting the present invention. Those skilled in the art should understand that any implementation manner of closing the virtual environment when satisfying the predetermined close condition should be included within the scope of the present invention.

According to the solution of the present embodiment, it can obtain behavior information of the dangerous file by running the dangerous file in the virtual environment of the computer device. The process needs no manual analysis and thus greatly saves the time needed for obtaining the behavior information; moreover, because all operation behaviors of the dangerous file may be recorded through virtual execution of virtual API(s), the behavior information obtained by the computer device is comprehensive, thereby avoiding an occasion that the real environment of the computer device cannot be comprehensively repaired due to incomplete behavior information.

Additionally, running a dangerous file in a virtual environment will not affect the real environment of the computer device; besides, the occupation space of the virtual environment in the computer devices extremely small; moreover, in the virtual environment, it is not needed to actually perform the function of the virtual API; instead, it is only needed to return a feedback result identical to that of invoking a real API corresponding to the virtual API in the real environment. This enables the dangerous file to run in the virtual environment faster, thereby quickly obtaining the behavior information of the dangerous file.

Figure 2:
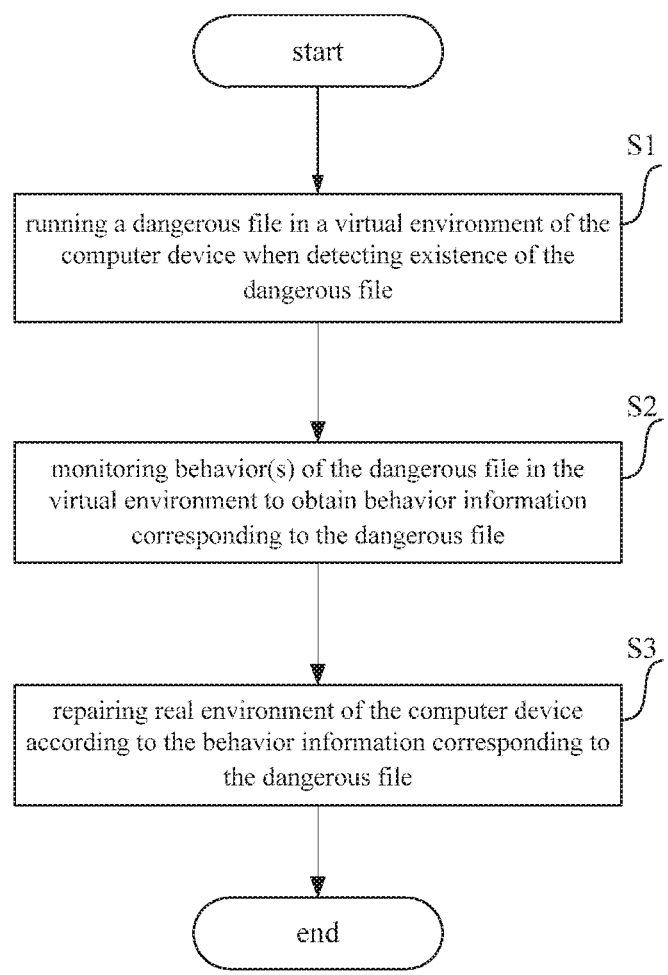
FIG. 2 shows a flow diagram of a method for determining behavior information corresponding to a dangerous file in a computer device according to another embodiment of the present disclosure.

FIG. 2 shows a flow diagram of a method for determining behavior information corresponding to a dangerous file in a computer device according to another embodiment of the present disclosure. Wherein, the method of the present embodiment is mainly implemented through a computer device; wherein any explanation of the computer device with reference to the embodiment shown in FIG. 1 is incorporated here by reference.

The method according to the present embodiment includes step S1, step S2, and step S3, wherein step S1 and step S2 have been described in detail with reference to FIG. 1, which will not be detailed here.

In step S3, the computer device repairs the real environment of the computer device according to the behavior information corresponding to the dangerous file.

Specifically, the computer device may repair the real environment of the computer device according to the behavior information corresponding to the dangerous file in multiple scenarios.

For example, after step S2, the computer device directly performs step S3 to repair the real environment of the computer device.

For another example, after step S2, when it is determined to clear the dangerous file according to an operation by a user, the computer device directly performs step S3 to repair the real environment of the computer device while clearing the dangerous file.

For another example, after clearing the dangerous file, when a need is determined to repair the real environment according to an operation by the user, the computer device performs step S3 to repair the real environment of the computer device.

Preferably, in step S3, the computer device directly performs operation(s) reverse to operation behavior(s) indicated by the behavior information according to the behavior information corresponding to the dangerous file so as to repair and recover the real environment of the computer device.

For example, the behavior information of the dangerous file includes information for indicating creating of a file, and path information of the created file. Then, in step S3, the computer device deletes the created file under the file path indicated by the path information according to the behavior information so as to recover the real environment to a state before running of the dangerous file.

For another example, the behavior information of the dangerous file includes information for indicating deleting of a registry entry, and the deleted registry entry. Then, in step S3, the computer device recovers the deleted registry entry according to the behavior information so as to recover the real environment to a state before running of the dangerous file.

As a preferred solution of step S3, the step S3 further includes step S31 and step S32.

In step S31, the computer device determines corresponding repair operation information according to the behavior information corresponding to the dangerous file.

Wherein, the repair operation information includes any information related to the repair operation. Preferably, the repair operation information includes, but not limited to:

a) Information Related to File Repair Operation.

Wherein, the file repair operation includes any operation for repairing a file, e.g., recovering file parameters, deleting a file and etc. Preferably, the information related to file repair operation includes, but not limited to, information for indicating a repair operation type of a file, name of the operated file, recovered file parameters, values of the file parameters, etc.

Preferably, the computer device scans, in its real system, the dangerous file and at least one file released by the dangerous file, and determines information related to file repair operation based on a result of scanning and the behavior information of the dangerous file.

b) Information Related to Registry Repair Operation

Wherein, the registry repair operation includes any operation for repairing a registry, e.g., restoring or deleting a registry entry, etc. Preferably, the information related to registry repair operation includes, but not limited to, information for indicating a repair operation type of the registry, operated registry entry, and a value corresponding to the registry entry, etc.

Preferably, when the registry repair operation is setting a registry entry, the computer device may obtain a default value corresponding to the registry entry by querying a local knowledge base, and set the default value as the value corresponding to the registry entry.

c) Information Related to Process Repair Operation wherein, the process repair operation includes any operation for repairing a process, e.g., closing and restarting a process, etc. Preferably, the information related to process repair operation includes, but not limited to: information for indicating a repair operation type of a process, path information corresponding to the operated process, etc.

It should be noted that when the operated process is a system file, the process repair operation may be directly completed through restarting the computer device, without a need of obtaining the repair operation information of the process.

d) Information Related to Thread Repair Operation wherein, the thread repair operation includes any operation for repairing a thread, e.g., suspending a thread, etc. Preferably, the information related to thread repair operation includes, but not limited to: information for indicating a repair operation type of a thread, and a feature value corresponding to the operated thread.

It should be noted that the repair operation information is only an example, not for limiting the present disclosure. Those skilled in the art should understand that any information related to the repair operation should be included within the scope of the repair operation information of the present disclosure.

Specifically, in step S31, the computer device determines repair operation(s) indicated by the repair operation information according to the operation behavior indicated by the behavior information corresponding to the dangerous file, and further determines the repair operation information according to the repair operation and the behavior information.

For example, the behavior information includes information for indicating cross-process writing and path information of the operated process; in step S31, the computer device determines the repair operation as a restart process according to the information for indicating cross-process write operation, and determines that, according to the repair operation and the behavior information, the repair operation information includes information for indicating a restart process and path information of the restarted process.

For another example, the behavior information includes information for indicating thread injection and a feature value corresponding to the operated thread; in step S31, the computer device determines the repair operation as a suspending thread according to the information for indicating thread injection, and determines that, according to the repair operation the and behavior information, the repair operation information includes information for indicating a suspending thread and a feature value corresponding to the suspended thread.

It should be noted that the example above is only for better illustrating the technical solution of the present invention, not for limiting the present invention. Those skilled in the art should understand that any implementation manner of determining corresponding repair operation information according to the behavior information corresponding to the dangerous file should be included within the scope of the present invention.

In step S32, the computer device repairs the real environment of the computer device according to the repair operation information.

For example, the repair operation information determined in step S31 includes the information for indicating restarting of the process and path information corresponding to the operated process. In step S32, the computer device looks up a corresponding process based on the path information and restarts the looked up process.

For another example, the repair operation information determined in step S31 includes information for indicating suspending a process and a feature value corresponding to the operated process. In step S32, the computer device determines a matching thread according to the feature value and suspends the thread.

It should be noted that the example above is only for better illustrating the technical solution of the present invention, not for limiting the present invention. Those skilled in the art should understand that any implementation manner of repairing the real environment of the computer device according to the repair operation information should be included within the scope of the present invention.

Preferably, after step S3, when it is judged to need to restart the computer device, the computer device presenting, to a user, prompt information for prompting restart of the computer device.

According to the solution of the present embodiment, the computer device can repair the real environment of the computer device according to the behavior information of the dangerous file obtained in the virtual environment, thereby quickly and comprehensively repairing the disruption to the real environment caused by the dangerous file and other dangerous file released by the dangerous file.

Figure 3:
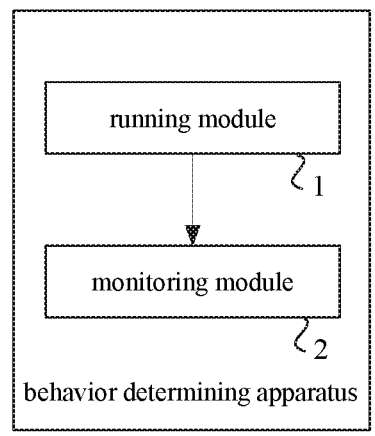
FIG. 3 shows a structural diagram of an apparatus for determining behavior information corresponding to a dangerous file in a computer device according to one embodiment of the present disclosure.

FIG. 3 shows a structural diagram of an apparatus for determining behavior information corresponding to a dangerous file in a computer device according to one embodiment of the present disclosure. The apparatus for determining behavior information corresponding to a dangerous file (hereinafter referred to as "behavior determining apparatus") according to the present embodiment includes a module (hereinafter referred to as "running module 1") configured to run the dangerous file in a virtual environment of the computer device when detecting existence of the dangerous file, wherein the virtual environment comprises at least one virtual API identical to at least one real API in a real environment of the computer device; a module (hereinafter referred to as "monitoring module 2") configured to monitor behavior(s) of the dangerous file in the virtual environment to obtain the behavior information corresponding to the dangerous file.

The running module 1 runs a dangerous file in a virtual environment of the computer device when detecting existence of a dangerous file.

Wherein, the dangerous file includes any file that is dangerous, e.g., a virus file, a Trojan file, etc.

Wherein, the virtual environment is used for virtualizing the real environment of the computer device, the virtual environment including at least one virtual API identical to at least one real API in the real environment. Wherein, the virtual API can be invoked in a virtual environment and can return a feedback result identical to that of invoking a real API corresponding to the virtual API in the real environment. Wherein, the real environment is used for indicating a system environment really running in the computer device, e.g., system environment corresponding to a Windows operating system really running in the computer device. Wherein, the real API is used for indicating an API in the real environment, e.g., a system API in a Windows operating system really running in the computer device.

For example, the real environment of the computer device has the following real API: DeleteFile. The real API is used for deleting a designated file in the real environment and returning a feedback result indicating successful execution of delete operation; the virtual environment in the computer device has a virtual API corresponding to the real API, invoking of the virtual API in the virtual environment also returns a feedback result for indicating successful execution of delete operation.

It should be noted that preferably, when invoking the virtual API in the virtual environment, a function of the virtual API is not really executed; and it is only needed to virtualize an effect of invoking a real API corresponding to the virtual API. For example, in the example above, the virtual API corresponding to DeleteFile is invoked in the virtual environment, the virtual API does not execute an operation of deleting the designated file in the virtual environment; instead, it directly returns, when being invoked, a feedback result for indicating successful execution of delete operation so as to virtualize an effect of invoking the DeleteFile.

Preferably, the virtual environment does not need to configure registry and environment variables and the like in the computer device, such that a corresponding install operation is not needed to execute, i.e., it can be directly started and run. It should be noted that the virtual environment may be started in a variety of scenarios, e.g., automatic start when the computer device is powered on, automatic start when a scanning operation is executed in the computer device, automatic start when detecting existence of a dangerous file, or started by user operation, etc. It should be noted that preferably, the virtual environment, each time after being started, is returned to its initial environment; more preferably, after the virtual environment is started, after each dangerous file is completely executed, the virtual environment may automatically execute an initialization operation, or may execute the initialization operation according to user operation so as to return the virtual environment to the initial environment.

It should be further noted that the occupation space of the virtual environment in the computer device may be extremely small (e.g., the occupation space is about 10M), and its running have no effect on running of the real system of the computer device. Preferably, a size of the occupation space may change according to behavior(s) of the dangerous file (e.g., the behavior of releasing other files by the dangerous file) in the virtual environment.

Specifically, when detecting existence of a dangerous file, the running module 1 provides the dangerous file to the virtual environment of the computer device and runs the dangerous file in the virtual environment.

For example, when detecting existence of a virus file in the computer device, the running module 1 provides the virus file to the virtual environment of the computer device and runs the virus file in the virtual environment.

Preferably, at least one virtual API in the virtual environment comprises an application reading virtual API capable of reading current active application(s), the running module 1 further including: a module (hereinafter referred to as "providing module," not shown) configured to provide application information of the currently active application(s) to the dangerous file when the dangerous file invokes the application reading virtual API.

Wherein, the application reading virtual API includes any virtual API that reads current active application(s), e.g., a virtual API corresponding to CreateToolhelp32Snapshot in the real system, the CreateToolhelp32Snapshot is for obtaining information of all currently active processes in the real system.

Wherein, the application information includes any information for indicating currently active application(s), e.g., an application name of the currently active application, a process ID of the currently active application, etc.

Specifically, during a process of running a dangerous file in a virtual environment, when the dangerous file invokes an application reading virtual API, the providing module returns application information of the currently active application(s) to the dangerous file through the reading virtual API.

For example, running a virus file file1 in a virtual environment; when the file1 invokes the application reading virtual API, the providing module returns application information of the currently active application(s) to file1 through the application reading virtual API, the application information is for indicating that the currently active applications comprises APP1 and APP2.

It should be noted that the application reading virtual API may employ a plurality of manners to obtain the application information of the currently active application(s).

As an example, the application reading virtual API obtains the application information of the currently active application(s) by configuring, by a user, process(es) of the virtual environment. For example, the user configures a process list in the virtual environment, adds applications APP1 and APP2 in the process list; then the currently active applications that can be read by the application reading virtual API according to the process list include APP1 and APP2.

As another example, the application reading virtual API triggers obtaining application information of the currently active application(s) from the real environment of the computer device. For example, the application reading virtual API triggers invoking a real API corresponding to the application reading virtual API in the real environment of the computer device, and obtains application information of the currently active application(s) according to a result returned by the real API.

It should be noted that the example above is only for better illustrating the technical solution of the present invention, not for limiting the present invention. Those skilled in the art should understand that any implementation manner of running the dangerous file in the virtual environment of the computer device when detecting existence of the dangerous file should be included within the scope of the present invention.

The monitoring module 2 monitors behavior(s) of the dangerous file in the virtual environment to obtain the behavior information corresponding to the dangerous file.

Specifically, the monitoring module 2 may obtain behavior information corresponding to the dangerous file by monitoring and recording behavior(s) executed by the dangerous file in the virtual environment.

Preferably, in the virtual environment, the monitoring module 2 monitors the behavior(s) of the dangerous file based on the virtual API(s) invoked by the dangerous file during the running process, so as to obtain behavior information corresponding to the dangerous file.

For example, in the virtual environment, the monitoring module 2 records all behaviors of the dangerous file causing the virtual environment to change by the virtual API(s) invoked by the dangerous file during the running process, and obtains behavior information corresponding to such behaviors.

Wherein, the behavior information includes any information related to the operation behaviors of the dangerous file in the virtual environment. Preferably, the behavior information includes, but not limited to:

1) Information Related to File Operation Behavior.

Wherein, the file operation behavior includes any operation behavior that can be executed on a file, e.g., creating, updating, and deleting a file, etc. Preferably, the information related to file operation behavior includes, but not limited to, information for indicating an operation behavior type of a file (e.g., creating, updating, and deleting operation behaviors), name of the operated file(s), path information of the operated file, etc.

2) Information Related to Registry Operation Behavior.

Wherein, the registry operation behavior includes any operation behavior that can be executed on the registry, e.g., creating, setting, and deleting a registry entry, etc. Preferably, the information related to registry operation behavior includes, but not limited to: information for indicating an operation behavior type (e.g., creating, setting, and deleting operation behaviors), registry entry being operated, and a value corresponding to the registry entry, etc.

3) Information Related to Process Operation Behavior.

Wherein, the process operation behavior includes any operation behavior that can be executed on process, e.g., creating and closing a process, cross-process writing, etc. Preferably, the information related to process operation behavior includes, but not limited to, information for indicating an operation behavior type of a thread (e.g., creating and closing a process, cross-process writing), an identifier ID of the operated process, path information corresponding to the operated process, etc.

4) Information Related to Thread Operation Behavior.

Wherein, the thread operation behavior includes any operation behavior that can be executed on the thread, e.g., thread injection, etc. Preferably, the information related to thread operation behavior includes, but not limited to: information for indicating an operation behavior type of the thread, an identifier ID of the operated thread, a feature value corresponding to the operated thread, etc.; wherein, the feature value is used for indicating feature(s) of the thread. Preferably, the feature value is a check value corresponding to the code length of the thread; for example, the code length of the thread is 0x100, and the feature value is a CRC (Cyclic Redundancy Check) 32 value corresponding to the code length.

It should be noted that the behavior information is only an example, not a limitation to the present invention. Those skilled in the art should understand any information related to behaviors of a dangerous file in a virtual environment should be included within a scope of the behavior information depicted herein.

As a preferred solution, the behavior determining module of the present embodiment further includes a module configured to obtain at least one file released by the dangerous file in a virtual environment (hereinafter referred to as "obtaining module", not shown); the monitoring module 2 further includes a module (hereinafter referred to as "sub-monitoring module", not shown) configured to monitor, in the virtual environment, behavior(s) of the dangerous file and the at least one file released by the dangerous file, so as to obtain behavior information corresponding to the dangerous file.

In the virtual environment, the obtaining module obtains at least one file released by the dangerous file.

For example, in the virtual environment, the obtaining module obtains the following files released by the dangerous file file2 during the running process: ser2vet.ext, autorun.inf.

In the virtual environment, the sub-monitoring module monitors behavior(s) of the dangerous file and the at least one file released by the dangerous file, so as to obtain behavior information corresponding to the dangerous file.

For example, the obtaining module obtains the following dangerous files released by the dangerous file file2: ser2vet.exe, autorun.inf; in the virtual environment, the sub-monitoring module monitors behaviors of file2, ser2vet.exe, and autorun.inf respectively, so as to obtain behavior information of the three dangerous files and takes the obtained behavior information as the behavior information corresponding to the dangerous file file2.

It should be noted that the manner in which the sub-monitoring module monitors behavior(s) of each file released by the dangerous file is identical or similar to the manner of monitoring behavior(s) of dangerous files in aforesaid monitoring module 2, which will not be detailed here.

It should be noted that the example above is only for better illustrating the technical solution of the present invention, not for limiting the present invention. Those skilled in the art should understand that any implementation manner of monitoring behavior(s) of the dangerous file in the virtual environment to obtain behavior information corresponding to the dangerous file should be included within the scope of the present invention.

As a preferred solution, the behavior determining module of the present embodiment further includes a module (hereinafter referred to as "closing module," not shown) configured to close the virtual environment when satisfying a predetermined closing condition.

When satisfying a predetermined close condition, the closing module closes the virtual environment.

Wherein, the predetermined close condition comprises any predetermined condition for indicating closing of the virtual environment. Preferably, the predetermined close condition includes, but not limited to:

1) The Dangerous File Performs Process Exit Operation in the Virtual Environment.

Wherein, the process exit operation includes any operation for indicating exiting from the process of the dangerous file; preferably, the process exit operation includes, but not limited to, an auto-delete operation of the dangerous file, an operation of deleting the dangerous file executed by the user in the virtual environment, etc.

2) Running Time of the Dangerous File in the Virtual Environment Exceeds a Predetermined Time.

For example, if the predetermined time is 5 s, when the running time of the dangerous file in the virtual environment exceeds 5 s, the predetermined close condition is satisfied.

It should be noted that the predetermined close condition is only exemplary, not for limiting the present invention. Those skilled in the art should understand that any predetermined condition for indicating closing of the virtual environment should be included within the scope of the predetermined close condition of the present invention.

It should be noted that the example above is only for better illustrating the technical solution of the present invention, not for limiting the present invention. Those skilled in the art should understand that any implementation manner of closing the virtual environment when satisfying the predetermined close condition should be included within the scope of the present invention.

According to the solution of the present embodiment, it can obtain behavior information of the dangerous file by running the dangerous file in the virtual environment of the computer device to obtain behavior information of the dangerous file. The process needs no manual analysis and thus greatly saves the time needed for obtaining the behavior information; moreover, because all operation behaviors of the dangerous file may be recorded through virtual execution of virtual API(s), the behavior information obtained by the computer device is comprehensive, thereby avoiding an occasion that the real environment of the computer device cannot be comprehensively repaired due to incomplete behavior information.

Additionally, running a dangerous file in a virtual environment will not affect the real environment of the computer device; besides, the occupation space of the virtual environment in the computer devices extremely small; moreover, in the virtual environment, it is not needed to actually perform the function of the virtual API; instead, it is only needed to return a feedback result identical to that of invoking a real API corresponding to the virtual API in the real environment. This enables the dangerous file to run in the virtual environment faster, thereby quickly obtaining the behavior information of the dangerous file.

Figure 4:
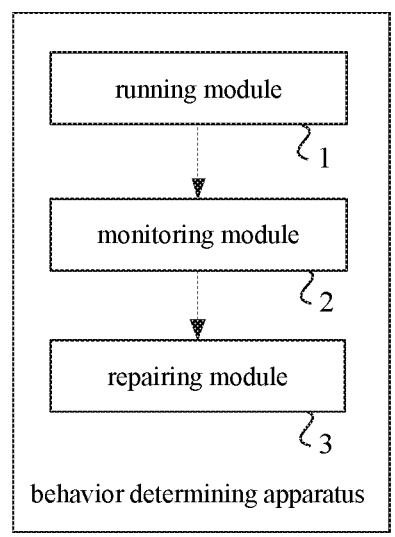
FIG. 4 shows a structural diagram of an apparatus for determining behavior information corresponding to a dangerous file in a computer device according to another embodiment of the present disclosure.

FIG. 4 shows a structural diagram of an apparatus for determining behavior information corresponding to a dangerous file in a computer device according to one embodiment of the present disclosure. The behavior determining apparatus according to the present embodiment includes a running module 1, a monitoring module 2, and a module (hereinafter referred to as "repairing module 3") configured to repair the real environment of the computer device according to the behavior information corresponding to the dangerous file. Wherein, the running module 1 and the monitoring module 2 have been described in detail with reference to FIG. 3, which will not be detailed here.

The repairing module 3 repairs the real environment of the computer device according to the behavior information corresponding to the dangerous file.

Specifically, the repairing module 3 may repair the real environment of the computer device according to the behavior information corresponding to the dangerous file in multiple scenarios.

For example, after the monitoring module 2 operates, the repairing module 3 directly operates to repair the real environment of the computer device.

For another example, after the monitoring module 2 operates, when it is determined to clear the dangerous file according to an operation by a user, the repairing module 3 directly operates to repair the real environment of the computer device while clearing the dangerous file.

For another example, after clearing the dangerous file, when a need is determined to repair the real environment according to an operation by the user, the repairing module 3 operates to repair the real environment of the computer device.

Preferably, the repairing module 3 directly performs operation(s) reverse to operation behavior(s) indicated by the behavior information according to the behavior information corresponding to the dangerous file so as to repair and recover the real environment of the computer device.

For example, the behavior information of the dangerous file includes information for indicating creating of a file, and path information of the created file. Then, the repairing module 3 deletes the created file under the file path indicated by the path information according to the behavior information so as to recover the real environment to a state before running of the dangerous file.

For another example, the behavior information of the dangerous file includes information for indicating deleting of a registry entry, and the deleted registry entry. Then, the repairing module 3 recovers the deleted registry entry according to the behavior information so as to recover the real environment to a state before running of the dangerous file.

As a preferred solution of repairing module 3, the repairing module 3 further includes a module (hereinafter referred to as a "determining module," not shown) configured to determine corresponding repair operation information according to the behavior information corresponding to the dangerous file, and a module (hereinafter referred to as a "sub-repairing module," not shown) configured to repair the real environment of the computer device according to the repair operation information.

The determining module determines corresponding repair operation information according to the behavior information corresponding to the dangerous file.

Wherein, the repair operation information includes any information related to the repair operation. Preferably, the repair operation information includes, but not limited to:

a) Information Related to File Repair Operation.

Wherein, the file repair operation includes any operation for repairing a file, e.g., recovering file parameters, deleting a file and etc. Preferably, the information related to file repair operation includes, but not limited to, information for indicating a repair operation type of a file, name of the operated file, recovered file parameters, values of the file parameters, etc.

Preferably, the determining module scans, in the real system of the computer device, the dangerous file and at least one file released by the dangerous file, and determines information related to file repair operation based on a result of scanning and the behavior information of the dangerous file.

b) Information Related to Registry Repair Operation

Wherein, the registry repair operation includes any operation for repairing a registry, e.g., restoring or deleting a registry entry, etc. Preferably, the information related to registry repair operation includes, but not limited to, information for indicating a repair operation type of the registry, operated registry entry, and a value corresponding to the registry entry, etc.

Preferably, when the registry repair operation is setting a registry entry, the determining module may obtain a default value corresponding to the registry entry by querying a local knowledge base, and set the default value as the value corresponding to the registry entry.

c) Information Related to Process Repair Operation wherein, the process repair operation includes any operation for repairing a process, e.g., closing and restarting a process, etc. Preferably, the information related to process repair operation includes, but not limited to: information for indicating a repair operation type of a process, path information corresponding to the operated process, etc.

It should be noted that when the operated process is a system file, the process repair operation may be directly completed through restarting the computer device, without a need of obtaining the repair operation information of the process.

d) Information Related to Thread Repair Operation wherein, the thread repair operation includes any operation for repairing a thread, e.g., suspending a thread, etc. Preferably, the information related to thread repair operation includes, but not limited to: information for indicating a repair operation type of a thread, and a feature value corresponding to the operated thread.

It should be noted that the repair operation information is only an example, not for limiting the present disclosure. Those skilled in the art should understand that any information about the repair operation should be included within the scope of the repair operation information of the present disclosure.

Specifically, the determining module determines a repair operation indicated by the repair operation information according to the operation behavior indicated by the behavior information corresponding to the dangerous file, and further determines the repair operation information according to the repair operation and the behavior information.

For example, the behavior information includes information for indicating cross-process writing and path information of the operated process; the determining module determines the repair operation as a restart process according to the information indicating cross-process write operation, and determines that, according to the repair operation and the behavior information, the repair operation information includes information for indicating a restart process and path information of the restarted process.

For another example, the behavior information includes information for indicating thread injection and a feature value corresponding to the operated thread; the determining module determines the repair operation as a suspending thread according to the information for indicating thread injection, and determines that, according to the repair operation and the behavior information, the repair operation information includes information for indicating a suspending thread and a feature value corresponding to the suspended thread.

It should be noted that the example above is only for better illustrating the technical solution of the present invention, not for limiting the present invention. Those skilled in the art should understand that any implementation manner of determining corresponding repair operation information according to the behavior information corresponding to the dangerous file should be included within the scope of the present invention.

The sub-repair module repairs the real environment of the computer device according to the repair operation information.

For example, the repair operation information determined by the determining module includes the information for indicating restarting of the process and path information corresponding to the operated process. The sub-repair module looks up a corresponding process based on the path information and restarts the looked up process.

For another example, the repair operation information determined by the determining module includes information for indicating suspending a process and a feature value corresponding to the operated process. The sub-repairing module determines a matching thread according to the feature value and suspends the thread.

It should be noted that the example above is only for better illustrating the technical solution of the present invention, not for limiting the present invention. Those skilled in the art should understand that any implementation manner of repairing the real environment of the computer device according to the repair operation information should be included within the scope of the present invention.

Preferably, after the repairing module 3 operates, when it is judged to need to restart the computer device, the computer device presenting, to a user, prompt information for prompting restart of the computer device.

According to the solution of the present embodiment, the computer device can repair the real environment of the computer device according to the behavior information of the dangerous file as obtained in the virtual environment, thereby quickly and comprehensively repairing the disruption to the real environment caused by the dangerous file and other dangerous file released by the dangerous file.

It should be noted that the present invention may be implemented in software and/or a combination of software and hardware. For example, respective modules in the present invention may be implemented by ASIC (Application Specific Integrated Circuit) or any other similar hardware device. In one embodiment, the software program of the present invention may be executed through the processor to implement the steps or functions as aforesaid. Likewise, a software program (including relevant data structure) of the present invention may be stored in a computer readable recording medium, e.g., RAM (random access memory) memory, magnetic or optical driver or a floppy disk, and a similar device. In addition, some steps or functions of the present invention may be implemented by hardware, e.g., as a circuit cooperating with the processor to execute various steps or functions.

To those skilled in the art, it is apparent that the present disclosure is not limited to the details of the above exemplary embodiments, and the present disclosure may be implemented with other forms without departing from the spirit or basic features of the present disclosure. Thus, in any way, the embodiments should be regarded as exemplary, not limitative; the scope of the present disclosure is limited by the appended claims, instead of the above depiction. Thus, all variations intended to fall into the meaning and scope of equivalent elements of the claims should be covered within the present disclosure. No reference signs in the claims should be regarded as limiting the involved claims. Besides, it is apparent that the term "comprise/comprising/include/including" does not exclude other units or steps, and singularity does not exclude plurality. A plurality of units or means stated in the apparatus claims may also be implemented by a single unit or means through software or hardware. Terms such as the first and the second are used to indicate names, but do not indicate any particular sequence.

What is claimed is:

1. A method for determining behavior information corresponding to a dangerous file in a computer device, comprising:
running the dangerous file in a virtual environment of the computer device when existence of the dangerous file in the computer device is detected, wherein a real environment is used for indicating a system environment really running in said computer device, and said virtual environment is used for virtualizing said real environment and comprises at least one virtual API identical to at least one real API in the real environment of the computer device, wherein invoking a virtual API of the at least one virtual API returns a feedback result identical to that of invoking a real API corresponding to the virtual API in the real environment;
monitoring behavior(s) of the dangerous file in the virtual environment to obtain the behavior information corresponding to the dangerous file; and
repairing the real environment of the computer device according to the behavior information corresponding to the dangerous file.

2. The method according to claim 1, wherein the at least one virtual API comprises an application reading virtual API capable of reading currently active application(s), and the step of running the dangerous file in the virtual environment comprises:
 providing application information of the currently active application(s) to the dangerous file when the dangerous file invokes the application reading virtual API.

3. The method according to claim 1, further comprising:
 obtaining, in the virtual environment, at least one file released by the running dangerous file;
 wherein the step of monitoring behavior(s) of the dangerous file in the virtual environment to obtain the behavior information corresponding to the dangerous file comprises:
 monitoring, in the virtual environment, behavior(s) of the dangerous file and the at least one file to obtain the behavior information corresponding to the dangerous file.

4. The method according to claim 1, wherein the behavior information comprises at least one of the following:
 information related to file operation behavior;
 information related to registry operation behavior;
 information related to process operation behavior;
 information related to thread operation behavior.

5. The method according to claim 1, wherein the step of repairing the real environment of the computer device according to the behavior information corresponding to the dangerous file comprises:
 determining corresponding repair operation information according to the behavior information corresponding to the dangerous file;
 repairing the real environment of the computer device according to the repair operation information.

6. The method according to claim 5, wherein the repair operation information comprises at least one of the following:
 information related to file repair operation;
 information related to registry repair operation;
 information related to process repair operation;
 information relates to thread repair operation.

7. The method according to claim 1, further comprising:
 closing the virtual environment when satisfying a predetermined close condition.

8. The method according to claim 7, wherein the predetermined close condition comprises at least one of the following:
 the dangerous file performs process exit operation in the virtual environment;
 running time of the dangerous file in the virtual environment exceeds a predetermined time.

9. The method according to claim 1, wherein the invoking a virtual API of the at least one virtual API returns a feedback result identical to that of invoking a real API corresponding to the virtual API in the real environment comprises:
 invoking the virtual API of the at least one virtual API returns, without executing a function of the virtual API, the feedback result identical to that of invoking the real API corresponding to the virtual API in the real environment.

10. An apparatus for determining behavior information corresponding to a dangerous file in a computer device, comprising:
 at least one processor; and
 a memory storing instructions, the instructions when executed by the at least one processor, cause the at least one processor to perform operations, the operations comprising:
 running the dangerous file in a virtual environment of the computer device when existence of the dangerous file in the computer device is detected, wherein a real environment is used for indicating a system environment really running in said computer device, and said virtual environment is used for virtualizing said real environment and comprises at least one virtual API identical to at least one real API in the real environment of the computer device, wherein invoking a virtual API of the at least one virtual API returns a feedback result identical to that of invoking a real API corresponding to the virtual API in the real environment;
 monitoring behavior(s) of the dangerous file in the virtual environment to obtain the behavior information corresponding to the dangerous file; and
 repairing the real environment of the computer device according to the behavior information corresponding to the dangerous file.

11. The apparatus according to claim 10, wherein the at least one virtual API comprises an application reading virtual API capable of reading currently active application(s), and the running the dangerous file in the virtual environment comprises:
 providing application information of the currently active application(s) to the dangerous file when the dangerous file invokes the application reading virtual API.

12. The apparatus according to claim 10, further comprising:
 obtaining, in the virtual environment, at least one file released by the running dangerous file;
 wherein the monitoring behavior(s) of the dangerous file in the virtual environment to obtain the behavior information corresponding to the dangerous file comprises:
 monitoring, in the virtual environment, behavior(s) of the dangerous file and the at least one file to obtain the behavior information corresponding to the dangerous file.

13. The apparatus according to claim 10, wherein the behavior information comprises at least one of the following:
 information related to file operation behavior;
 information related to registry operation behavior;
 information related to process operation behavior;
 information related to thread operation behavior.

14. The apparatus according to claim 10, wherein repairing the real environment of the computer device according to the behavior information corresponding to the dangerous file comprises:
 determining corresponding repair operation information according to the behavior information corresponding to the dangerous file;
 repairing the real environment of the computer device according to the repair operation information.

15. The apparatus according to claim 14, wherein the repair operation information comprises at least one of the following:
 information related to file repair operation;
 information related to registry repair operation;
 information related to process repair operation;
 information relates to thread repair operation.

16. The apparatus according to claim 10, wherein the operations further comprise:
   closing the virtual environment when satisfying a predetermined close condition.

17. The apparatus according to claim 16, wherein the predetermined close condition comprises at least one of the following:
   the dangerous file performs process exit operation in the virtual environment;
   running time of the dangerous file in the virtual environment exceeds a predetermined time.

18. A non-transitory computer readable storage medium storing a computer program, wherein the computer program, when executed by a processor, cause the processor to perform operations, the operations comprising:
   running a dangerous file in a virtual environment of a computer device when existence of the dangerous file in the computer device is detected, wherein a real environment is used for indicating a system environment really running in said computer device, and said virtual environment is used for virtualizing said real environment and comprises at least one virtual API identical to at least one real API in the real environment of the computer device, wherein invoking a virtual API of the at least one virtual API returns a feedback result identical to that of invoking a real API corresponding to the virtual API in the real environment;
   monitoring behavior(s) of the dangerous file in the virtual environment to obtain the behavior information corresponding to the dangerous file; and
   repairing the real environment of the computer device according to the behavior information corresponding to the dangerous file.

* * * * *